Dec. 25, 1956   E. KRUCK   2,775,222
DOG BED
Filed Nov. 9, 1954
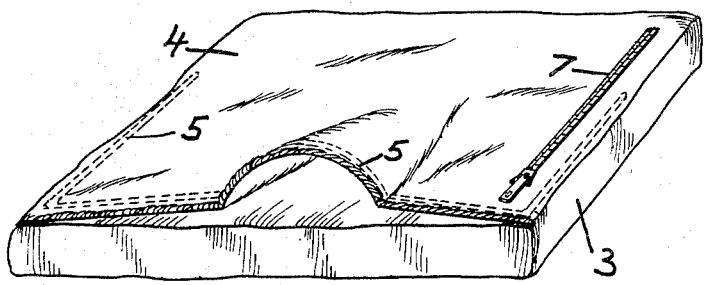
INVENTOR.

United States Patent Office 2,775,222
Patented Dec. 25, 1956

2,775,222

DOG BED

Eugene Kruck, Huntington Station, N. Y.

Application November 9, 1954, Serial No. 467,701

2 Claims. (Cl. 119—1)

This invention relates to dog beds and aims to provide an improved dwelling for dogs.

The particular object of my invention is to provide a dog bed in which the dog can enter at his own will when feeling cool without help of human beings.

A further object to my invention is to provide a bed so that the dog can lay on top of the cover when feeling warm without being disturbed by the entrance opening.

A further object to my invention is to provide a compact dog bed on which the cover blanket consists of two sheets with an opening on one side, and a means for increasing the thickness of the cover by sliding paper or cloth in between the two sheets.

A further object to my invention is to provide a dog bed in which the dog can stand upright underneath the blanket and when laying down in the position wanted, will be covered up perfectly.

A further object to my invention is to provide a compact dog bed which gives the dog a healthy place to rest on irrespective of temperature or atmospheric conditions especially if plastic for the cover and foam rubber for the pillow filling is used in constructing the bed.

A specific embodiment of apparatus for carrying out my invention is illustrated in the accompanying drawings in which:

The figure is a perspective view of the dog bed.

In the figure numeral 3 indicates a pillow to which is fastened a blanket 4 by any conventional way. The blanket is fastened to the pillow on three sides only, the fourth side being open and held in a partially open position by a flexible spring member 5 attached to the edge in a suitable way. This opening which is substantially oval provides an entrance for a dog under the blanket and on top of the pillow which may be of foam rubber. The blanket may be of plastic material to render it weather proof.

The oval opening formed by the spring 5 is just large enough to accommodate the snout of a dog. When the dog enters the bed by crawling through the opening he can raise the blanket enough to provide a space so that he can move freely to find a suitable position to lay down. As soon as the dog lays down on the pillow, the sides of the pillow which were raised by the blanket being raised, now fall back on the floor and bring the blanket into close contact with the dog providing a snug cover.

The dog can recline on the top of the blanket if he chooses, the flexible spring yielding under the weight of the dog and not being uncomfortable.

The blanket is constructed of two layers, access being obtained through a slide fastener 7 through which the blanket may be made thicker by inserting paper or cloth. Additional warmth is therefor obtained in an easy manner.

What is claimed is:

1. In a dog bed a substantially rectangular pillow, a blanket fastened on three sides of said pillow said blanket being of a larger dimension in length and width than that of said pillow, an arcuate spring member enclosed in a marginal portion of the free side of said blanket, providing an oval opening to the space between said blanket and said pillow, whereby a dog upon entering said opening would raise and enlarge said opening after which upon the bedding of the dog the opening would return to its previous size providing space for ventilation and observation.

2. A dog bed construction as set forth in claim 1 wherein said blanket includes two layers of textile material of which the upper layer is provided with a closable opening, through which inserted insulating material and the arcuate spring is installed and can be removed for cleaning purposes.

References Cited in the file of this patent

UNITED STATES PATENTS

| | | |
|---|---|---|
| 1,879,473 | Pitts | Sept. 27, 1932 |
| 1,887,108 | Steese | Nov. 8, 1932 |
| 1,890,163 | Rose | Dec. 6, 1932 |
| 2,032,248 | Bins | Feb. 25, 1936 |